United States Patent
Wang et al.

(10) Patent No.: US 10,813,133 B2
(45) Date of Patent: Oct. 20, 2020

(54) METHODS AND APPARATUS RELATING TO RANDOM ACCESS IN A WIRELESS COMMUNICATIONS NETWORK

(71) Applicant: Telefonaktiebolaget LM Ericsson (publ), Stockholm (SE)

(72) Inventors: Min Wang, Luleå (SE); Jan Christoffersson, Luleå (SE); Mats Folke, Vällingby (SE); Jinhua Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 225 days.

(21) Appl. No.: 15/779,183

(22) PCT Filed: Apr. 16, 2018

(86) PCT No.: PCT/SE2018/050382
§ 371 (c)(1),
(2) Date: May 25, 2018

(87) PCT Pub. No.: WO2019/032001
PCT Pub. Date: Feb. 14, 2019

(65) Prior Publication Data
US 2020/0029364 A1  Jan. 23, 2020

Related U.S. Application Data

(60) Provisional application No. 62/544,397, filed on Aug. 11, 2017.

(51) Int. Cl.
*H04W 74/08* (2009.01)
*H04L 12/24* (2006.01)
(Continued)

(52) U.S. Cl.
CPC .......... *H04W 74/0833* (2013.01); *H04L 41/08* (2013.01); *H04W 76/27* (2018.02); *H04W 84/042* (2013.01)

(58) Field of Classification Search
CPC ..... H04W 74/00; H04W 76/00; H04W 84/00; H04L 41/00
See application file for complete search history.

(56) References Cited

U.S. PATENT DOCUMENTS

2004/0147274 A1   7/2004 Khawand et al.
2010/0255847 A1* 10/2010 Lee .................... H04W 74/004
                                                   455/436
(Continued)

FOREIGN PATENT DOCUMENTS

| WO | 2006044714 A1 | 4/2006 |
| WO | 2012016538 A1 | 2/2012 |
| WO | 2017052144 A1 | 3/2017 |

OTHER PUBLICATIONS

3GPP TSG-RAN WG2 #97bis, Tdoc R2-1702657, Spokane, USA, Apr. 3-7, 2017, Ericsson, Random Access Enhancements, pp. 1-3. (Year: 2017).*
(Continued)

*Primary Examiner* — Andrew Lai
*Assistant Examiner* — Sumitra Ganguly
(74) *Attorney, Agent, or Firm* — Murphy, Bilak & Homiller, PLLC

(57) ABSTRACT

The disclosure provides methods and apparatus relating to random access in a wireless communications network. In one aspect, a method in a user equipment comprises: detecting an event triggering a random access procedure; determining an adjustment for a random access parameter as a function of one or more of: a type of the event triggering the random access procedure; and a characteristic of data to be transmitted or received by the UE upon completion of the
(Continued)

random access procedure; applying the adjustment to a configured value for the random access parameter to obtain an adjusted value for the random access parameter; and performing the random access procedure with a base station operable in the wireless communications network, using the adjusted value for the random access parameter.

18 Claims, 6 Drawing Sheets

(51) Int. Cl.
    *H04W 76/27* (2018.01)
    *H04W 84/04* (2009.01)

(56) References Cited

U.S. PATENT DOCUMENTS

| | | | | |
|---|---|---|---|---|
| 2012/0188897 A1* | 7/2012 | Shen | ................... | H04W 52/146 |
| | | | | 370/252 |
| 2014/0233502 A1* | 8/2014 | Fong | ....................... | H04L 27/26 |
| | | | | 370/329 |
| 2014/0274082 A1* | 9/2014 | Huang | .................. | H04W 28/20 |
| | | | | 455/450 |
| 2015/0009936 A1* | 1/2015 | Quan | ....................... | H04L 1/189 |
| | | | | 370/329 |
| 2015/0282214 A1 | 10/2015 | Lee et al. | | |

OTHER PUBLICATIONS

ETSI, "Evolved Universal Terrestrial Radio Access (E-UTRA); Medium Access Control (MAC) protocol specification", ETSI TS 136 321 V14.3.0 (3GPP TS 36.321 version 14.3.0 Release 14), Jul. 2017, pp. 1-109.

Unknown, Author , "Random Access Enhancements", 3GPP TSG-RAN WG2 #97bis, Tdoc R2-1702657, Ericsson, Spokane, USA, Apr. 3-7, 2017, 3 pages.

* cited by examiner

METHODS AND APPARATUS RELATING TO RANDOM ACCESS IN A WIRELESS COMMUNICATIONS NETWORK

TECHNICAL FIELD

Embodiments of the present disclosure relate to methods and apparatus in a wireless communications network, and particularly to methods and apparatus for random access in wireless communications networks.

BACKGROUND

Efforts are on-going to develop the next generation (5G) of telecommunications standards, meeting the performance requirements set out by the Next Generation Mobile Networks Alliance. The standard being developed by the Third Generation Partnership Project (3GPP) has come to be known as New Radio (NR).

One aspect which is common to NR and many other telecommunications standards (such as Long Term Evolution (LTE) and others) is that of random access, carried out for various reasons such as initial access, requesting additional system information (SI), intra-cell beam switch, handover, for uplink/downlink data transmission, regaining synchronization etc.

FIG. 1 is a schematic diagram showing the signaling between a wireless terminal device (UE) and a network node (eNB) during a random access procedure.

The signaling begins when the UE selects a random access preamble and transmits the preamble to the eNB. The random access preamble may be selected from a plurality of available preambles (for example, LTE comprises 64 possible random access preambles). The preamble may be transmitted to the eNB over a random access channel, such as the physical random access channel (PRACH). The preamble may also implicitly or explicitly comprise an identifier for the UE, e.g. radio access radio network temporary identifier (RA-RNTI). In the former case, the identifier may be implicitly indicated to the eNB through the particular radio resources used for transmission of the preamble (e.g. the time slot(s), frequency(ies), etc).

If the preamble is received and decoded by the eNB, a random access response (RAR) message is transmitted from the eNB to the UE. The RAR message may comprise an identifier for the UE for use in the random access procedure (such as a temporary cell radio network temporary identity (C-RNTI). The RAR message may further comprise an indication of uplink (UL) resources granted to the UE for the purposes of further transmissions to the eNB, e.g. on a shared channel such as the physical uplink shared channel (PUSCH). The RAR message may further comprise a timing advance parameter related to the round trip delay for signals transmitted between the eNB and the UE, allowing the UE to change its timing so as to compensate. The RAR message may be transmitted over a shared channel, such as the physical downlink shared channel (PDSCH).

Upon receipt of the RAR message, the UE utilizes the indicated radio resources to transmit a connection request message to the eNB. For example, the message may comprise a radio resource control (RRC) connection request message. The message identifies the UE using the temporary C-RNTI assigned in the previous message, and may additionally comprise a further identifier for the UE, such as a temporary mobile subscriber identity (TMSI) or a random number chosen for that purpose.

Upon receipt of the connection request message, the eNB responds with a contention resolution message. The contention resolution message may comprise an acknowledgement message (such as a HARQ ack message), to acknowledge receipt of the connection request message. The acknowledgement message is addressed to the further identifier for the UE (i.e., comprised within the previous message), and this message therefore acts to resolve any contention between multiple UEs that may have selected the same random access preamble, at the same time, in the first message (and therefore been assigned the same C-RNTI). The multiple UEs will not have selected the same further identifier (or are highly unlikely to have done so), and therefore only one of the UEs will receive the contention resolution message. The other UEs may consider the random access procedure to have failed, and subsequently initiate further random access procedures.

The four messages shown in FIG. 1 are sometimes known as msg1, msg2, msg3 and msg4 respectively.

Those skilled in the art will appreciate that a random access procedure may depart from the signaling shown in FIG. 1 in some instances. For example, with many users in the system, random access may induce high load if all random access attempts are to be handled by the network. For this reason, the eNB may transmit a backoff indicator (BI) in the RAR message which indicates to the UE to wait a certain random time, before transmitting a further random access preamble.

In LTE, the backoff time is calculated in accordance with Table 7.2-1 in TS 36.321 (version 14.3.0):

| Index | Backoff Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

Upon receipt of a BI index value in the RAR message, the UE shall:
  based on the BI index value, determine the Backoff Parameter Value and select a random backoff time according to a uniform distribution between 0 and the Backoff Parameter Value; and
  delay a subsequent random access transmission (e.g. transmission of a subsequent random access preamble) by the selected backoff time.

The BI index value therefore gives some ability to the eNB to control its load, and the BI index value may be selected according to that load. For example, if the eNB is experiencing high load, a BI index value corresponding to a higher Backoff Parameter Value may be selected and transmitted to the UE (or UEs); if the eNB is experiencing moderate load, a BI index value corresponding to a lower Backoff Parameter Value may be selected and transmitted to the UE (or UEs).

SUMMARY

One problem that has been identified with this process is that the BI index value, as well as values for other random access parameters, are selected or configured by the network (e.g. the eNB). However, a random access procedure may be triggered by multiple events relating to different types of data and different types of wireless terminal device. In general, these differing circumstances may have different latency requirements, which could be compromised if the network-configured values are used for a random-access procedure.

Embodiments of the present disclosure seek to address these and other problems.

In one aspect, there is provided a method in a wireless terminal device operable in a wireless communications network. The method comprises: detecting an event triggering a random access procedure; determining an adjustment for a random access parameter as a function of one or more of: a type of the event triggering the random access procedure; and a characteristic of data to be transmitted or received by the wireless terminal device upon completion of the random access procedure; applying the adjustment to a configured value for the random access parameter to obtain an adjusted value for the random access parameter; and performing the random access procedure with a network node operable in the wireless communications network, using the adjusted value for the random access parameter.

A wireless terminal device for performing the method described above and a computer program product comprising a non-transitory machine-readable medium storing instructions for carrying out the method described above are also disclosed.

In a further aspect, there is provided a method in a network node operable in a wireless communications network. The method comprises: configuring a wireless terminal device operable in the wireless communications network with one or more adjustment values for determining an adjustment for a random access parameter and obtaining an adjusted value for the random access parameter for use in a random access procedure, the adjustment being determined as a function of one or more of: a type of an event triggering the random access procedure; and a characteristic of data to be transmitted or received by the wireless terminal device upon completion of the random access procedure.

A network node for performing the method described above and a computer program product comprising a non-transitory machine-readable medium storing instructions for carrying out the method described above are also disclosed.

A further aspect provides a wireless terminal device operable in a wireless communication network. The wireless terminal device comprises processing circuitry and a non-transitory machine-readable medium storing instructions which, when executed by the processing circuitry, cause the wireless terminal device to: detect an event triggering a random access procedure; determine an adjustment for a random access parameter as a function of one or more of: a type of the event triggering the random access procedure; and a characteristic of data to be transmitted or received by the wireless terminal device upon completion of the random access procedure; apply the adjustment to a configured value for the random access parameter to obtain an adjusted value for the random access parameter; and perform the random access procedure with a network node operable in the wireless communications network, using the adjusted value for the random access parameter.

Another aspect provides a network node operable in a wireless communications network. The network node comprises processing circuitry and a non-transitory machine-readable medium storing instructions which, when executed by the processing circuitry, cause the network node to: configure a wireless terminal device operable in the wireless communications network with one or more adjustment values for determining an adjustment for a random access parameter and obtaining an adjusted value for the random access parameter for use in a random access procedure, the adjustment being determined as a function of one or more of: a type of an event triggering the random access procedure; and a characteristic of data to be transmitted or received by the wireless terminal device upon completion of the random access procedure.

A further aspect of the disclosure provides wireless terminal device operable in a wireless communication network. The wireless terminal device comprises: a detecting module configured to detect an event triggering a random access procedure; a determining module configured to determine an adjustment for a random access parameter as a function of one or more of: a type of the event triggering the random access procedure; and a characteristic of data to be transmitted or received by the wireless terminal device upon completion of the random access procedure; an applying module configured to apply the adjustment to a configured value for the random access parameter to obtain an adjusted value for the random access parameter; and a random access module configured to perform the random access procedure with a network node operable in the wireless communications network, using the adjusted value for the random access parameter.

Another aspect provides a network node operable in a wireless communications network. The network node comprises: a configuring module configured to configure a wireless terminal device operable in the wireless communications network with one or more adjustment values for determining an adjustment for a random access parameter and obtaining an adjusted value for the random access parameter for use in a random access procedure, the adjustment being determined as a function of one or more of: a type of an event triggering the random access procedure; and a characteristic of data to be transmitted or received by the wireless terminal device upon completion of the random access procedure.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
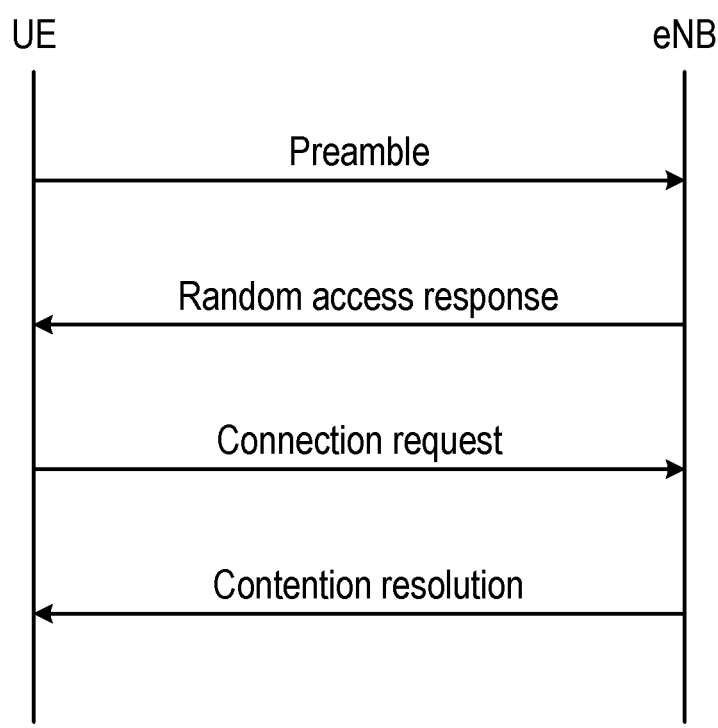
FIG. 1 is a schematic diagram showing the signaling in a random access procedure.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless terminal device, or user equipment (UE), it should be understood by the skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target device, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

In some embodiments a more general term "network node" is used and it can correspond to any type of radio access node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. Moreover, where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The embodiments are described for machine-type communication (MTC), evolved MTC (eMTC) and narrowband Internet of Things (NB-IoT). However, the embodiments are applicable to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000, 5G, NR, etc. It is recalled that 5G, the fifth generation of mobile telecommunications and wireless technology, is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term may be specified in 5G. A general description of the agreements on 5G NR Access Technology so far is contained in most recent versions of the 3GPP 38-series Technical Reports.

Figure 2:
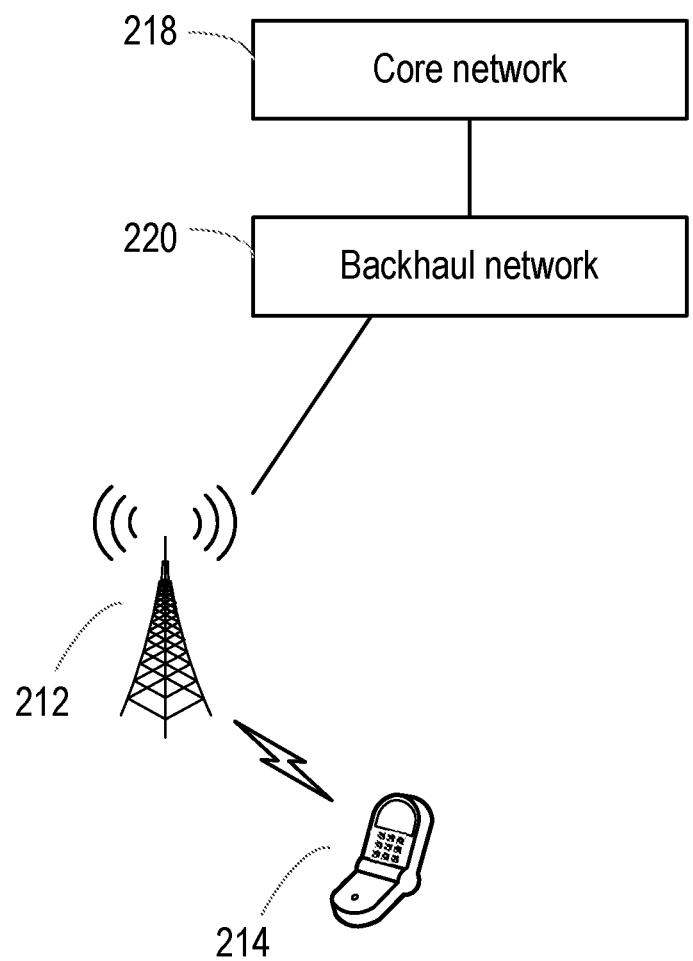
FIG. 2 shows a wireless communications network according to embodiments of the disclosure.

FIG. 2 shows a network 210 that may be utilized to explain the principles of embodiments of the present disclosure. The network 210 comprises a radio access network node 212 which is connected, via a backhaul network 220, to a core network 218. FIG. 2 also shows a wireless terminal (or UE, etc) 214 that is in wireless communication with the network node 212.

The wireless terminal 214 is operable to communicate with the network 210 and particularly the network node 212. Messages transmitted by the wireless terminal 214 to the network node 212 are said to be transmitted in the "uplink" (UL), while messages transmitted by the network node 212 to the wireless terminal 214 are said to be transmitted in the "downlink" (DL).

Figure 3:
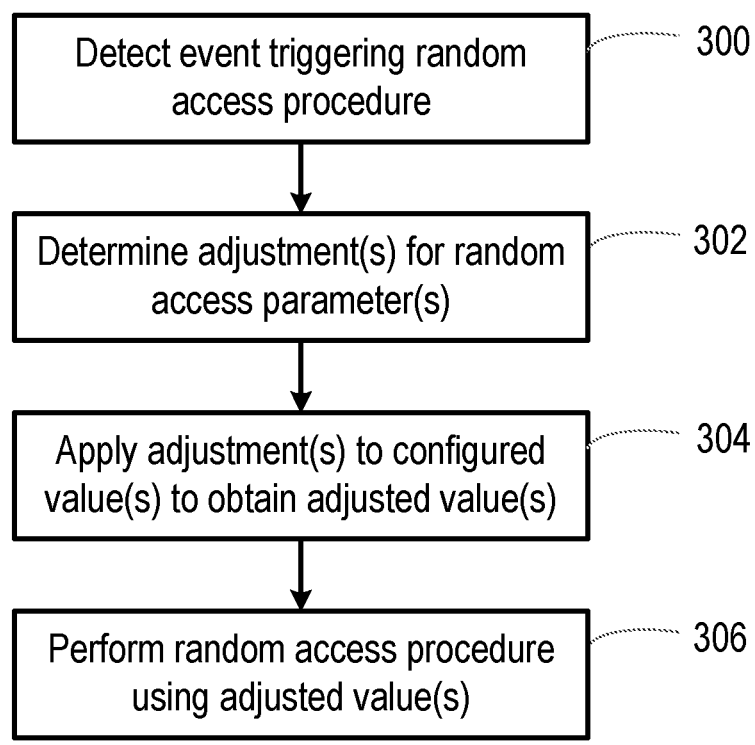
FIG. 3 is a flowchart of a method according to embodiments of the disclosure.

FIG. 3 is a flowchart of a method according to embodiments of the disclosure. The method may be carried out in a wireless terminal device (such as the wireless terminal device 214 for example) in communication with a network node (such as the radio access node 212 for example).

The method begins in step 300, in which the wireless terminal device detects an event triggering a random access procedure (e.g. as described above with respect to FIG. 1).

As noted above, numerous events may trigger a random access procedure, and the present disclosure is not limited in that respect. Currently, a random access procedure may be triggered due to one or more of the following events:

Initial access to the network, e.g. from a state such as RRC_IDLE.

Re-establishing a connection to the network, e.g., through an RRC Connection Re-establishment procedure.

Handover from one cell to another cell.

DL data arrival requiring random access procedure while the wireless terminal device is in a connected state such as RRC_CONNECTED, e.g. when UL synchronisation status is "non-synchronised".

UL data arrival requiring random access procedure while the wireless terminal device is in a connected state such as RRC_CONNECTED, e.g. when UL synchronisation status is "non-synchronised", or there are no uplink control channel (e.g. physical uplink control channel (PUCCH) resources available on which to transmit a scheduling request.

A requirement to determine the wireless terminal device position (e.g. while the wireless terminal device is in a connected state such as RRC_CONNECTED), e.g. when timing advance is needed for UE positioning.

On-demand system information (SI) transmission.

As noted above, this list is not exhaustive and one or more events triggering a random access procedure may be introduced in future for other purposes. For example, future systems are expected to make use of beamforming techniques to compensate for the higher attenuation rates at higher transmission frequencies. Thus transmissions between network nodes and wireless terminal devices may take place via one or more of a plurality of beams defined for each cell. A random access procedure may be triggered in order to recover transmissions with a beam which has temporarily been lost.

In step 302, the wireless terminal device determines an adjustment for a random access parameter, i.e. a parameter used in the performance of a random access procedure. Optionally, the wireless terminal device may determine respective adjustments for a plurality of random access parameters.

The adjustment may be determined as a function of, or based on, one or more of: the type of event which triggered the random access procedure; and a characteristic of the data which is to be transmitted or received by the wireless terminal device (i.e. in UL or DL) upon completion of the random access procedure. The latter quantity may alternatively be described as a characteristic of the data which caused the event triggering the random access procedure, e.g., a characteristic of the UL/DL data which has arrived for transmission to or for transmission by the wireless terminal device, and prompted the wireless terminal device to initiate a connection with the network, or re-establish a connection to the network, etc.

The adjustment may be determined on either of these quantities in isolation, or on both quantities together (in the latter case, particularly where an event relates to the transmission or reception of data). Additional factors or quantities may also be taken into account in determining the adjustment without departing from the scope of the disclosure.

The type of the event may be any one or more of the list of events described above with respect to step 300, for example. Further, it will be known to the skilled person that an event may relate to a combination of two or more of the events recited in that list (or future-defined events triggering a random access procedure).

The characteristic of the data for UL/DL transmission upon completion of the random access procedure may be defined in numerous ways. For example, the characteristic may relate to the priority or latency requirements of the data for transmission upon completion of the random access procedure.

One characteristic of the data, which may relate to the priority or latency requirements of the data, comprises an identifier for an application executable by the wireless terminal device to which the data relates, e.g. the application which generated the data for transmission to the network node, or the application which is to process the data received from the network node. For example, application ID (such as Android application ID or OS-specific application ID). Alternatively or additionally, the characteristic of the data may comprises a type of such an application.

The characteristic of the data may additionally or alternatively relate to the type of wireless terminal device. For example, the characteristic of data may comprise an access class or access category of the wireless terminal device. The access class may typically be used for an initial access control, e.g., access barring.

These quantities may be particularly suited to wireless terminal devices in an idle mode, such as RRC_IDLE, as the data in such devices may not have yet been processed by the network and assigned more formal identifiers. Where the wireless terminal device is in a connected mode, such as RRC_CONNECTED, more formal identifiers may be used to characterize the data.

For example, the characteristic may comprise an identifier for the data, such as one of: a flow ID, a session ID, a logical channel ID, a logical channel group ID, and a radio bearer identifier.

The characteristic of the data may comprise a priority indicator for the data, such as a quality of service (QoS) indicator; a logical channel priority value; and a logical channel group priority value. Possible QoS indicators include QoS class identifier (QCI) and 5G QoS indicator (5QI). The priority indicator may be associated with one of: a flow ID, a session ID, a logical channel ID, a logical channel group ID, and a radio bearer identifier.

The random access parameter(s) may comprise one or more of:

a backoff parameter, such as the backoff parameter value defining a maximum delay until a subsequent preamble transmission attempt, following a previous unsuccessful random access procedure. The wireless terminal device may select a random backoff time between 0 and the backoff parameter value (e.g. over a uniform distribution), and then delay the subsequent preamble transmission by that backoff time. According to embodiments of the disclosure, the backoff parameter value may be subject to an adjustment.

a backoff time. Alternatively, the backoff time itself (i.e. the random time selected between 0 and the backoff parameter value) may be adjusted directly.

an initial received target power (e.g. preambleInitialReceivedTargetPower). The initial received target power may define a desired power with which a preamble transmission is to be received by the network node. The transmit power of an initial preamble transmission may be determined by the wireless terminal device based on this parameter and an estimate of the uplink path loss.

a power ramping step between successive random access preamble transmissions (e.g. PowerRampingStep). Following an unsuccessful preamble transmission (i.e. a preamble transmission for which no RAR was received from the network node), a subsequent preamble transmission may be attempted at an increased transmit power. The power ramping step defines the increase in transmit power between consecutive preamble transmissions.

a maximum number of random access preamble transmissions to be carried out by the wireless terminal device (e.g. preambleTransMax). The maximum number of preamble transmissions a wireless terminal device may make, without receiving a RAR message from the network node, before abandoning the random access procedure and signaling an error to higher layer (e.g. upper layers relative to the media access control (MAC) layer).

a response window size for which the wireless terminal device waits for a response to a random access preamble transmission (e.g., ra-ResponseWindowSize). Following transmission of a random access preamble, the wireless terminal device waits for a response from the network node before taking further action. The response window size is the time window, defined in any appropriate time units (such as frames, subframes, time slots, etc), in which the wireless terminal device waits for a RAR message from the network node following transmission of a random access preamble.

a response window size for which the wireless terminal device waits for a response to a connection request (e.g. mac-ContentionResolutionTimer). Following transmission of a connection request (i.e. msg3), the wireless terminal device waits for a response from the network node before taking further action. The response window size is the time window, defined in any appropriate time units (such as frames, subframes, time slots, etc), in which the wireless terminal device waits for a contention resolution message (i.e. msg4) from the network node following transmission of a connection request.

a maximum number of retransmissions for a connection request (e.g., maxHARQ-Msg3Tx). Following transmission of a connection request (i.e. msg3), the wireless terminal device waits for a response from the network node before taking further action, (e.g. for a defined period of time such as mac-ContentionResolutionTimer). Following expiry of the timer or a negative acknowledgement from the network node, the wireless terminal device may retransmit the connection request. This parameter defines the maximum number of times that the wireless terminal device may transmit the connection request.

Thus an adjustment for any one or more of these random access parameters may be determined in step 302.

Values (that is, unadjusted values) for the random access parameters may be configured via signaling from the network node. For example, the values may be configured cell-wide, via system information (SI) broadcast, or device-specific via dedicated signaling (e.g. RRC signaling, msg2, etc). Alternatively, the values may be specified in a standard implemented by the wireless terminal device. In either case, the adjustment is applied to these configured values. Therefore the adjustment alters the configured values to (different) adjusted values.

The adjustment may be defined in terms of a scaling factor (i.e. which is multiplied by the configured value), or an offset (which is added to or subtracted from the configured value), or both. The values of the scaling factor may be more than or less than one (so representing an increase or a decrease to the configured value for the parameter). Similarly, the values for the offset may be positive or negative. Of course, for some event types and/or some data characteristics (or combinations thereof), the scaling factor may be equal to 1, and/or the offset may be equal to 0.

The adjustment may be defined such that, when applied to a particular configured value for the random-access parameter, a first adjusted value results for events or data characteristics being associated with a first latency requirement, and a second adjusted value results for events or data characteristics being associated with a second latency requirement. Particularly for random-access parameters relating to time (such as backoff time, backoff parameter value, ra-ResponseWindowSize, etc), if the second latency requirement is stricter than the first latency requirement (i.e. the events or data characteristics require lower latency), the second adjusted value may be smaller than the first adjusted value. That is, the random access procedure should be quicker for low-latency scenarios than would otherwise be the case. For random-access parameters relating to transmit power (such as preambleInitialReceivedTargetPower, powerRampingStep, etc), if the second latency requirement is stricter than the first latency requirement (i.e. the events or data characteristics require lower latency), the second adjusted value may be larger than the first adjusted value. That is, higher transmit powers would be used for low-latency scenarios than would otherwise be the case.

Thus, in this way, a wireless terminal device can ensure that data or events requiring low latency are handled with appropriate parameter values for random access procedures.

The wireless terminal device may determine the adjustment in a number of ways.

For example, the wireless terminal device may have access to one or more adjustment values (e.g. values for a scaling factor, values for an offset, etc). For example, the adjustment values may be defined in a specification implemented by the wireless terminal device (i.e. "hard-coded" in the specification), or configured via broadcast (e.g. SI) or dedicated (e.g. RRC, on-demand SI) signaling from the network node. The adjustment values may be defined in a cell-wide manner (i.e. applicable to all devices in a cell) or in a device-specific manner, or both. The adjustment values may be configured only for one or more particular device types or categories, such as ultra-reliable, low-latency communication (URLLC) capable devices, machine type communication (MTC) devices, etc.

Each adjustment value may be associated with a particular event type, or a particular data characteristic, or both, such that the adjustment value can be selected based on the particular event type or data characteristic. For example, the adjustment value(s) may be defined in a look-up table stored on the wireless terminal device.

One such look-up table may be implemented as follows:

| Application ID (or indicator of data priority) | Index of trigger event | Scale factor | offset |
|---|---|---|---|
| 1 | 1 | X1 | O1 |
| 2 | 2 | X2 | O2 |
| 3 | 1 | X3 | O3 |
| 4 | 3 | X4 | O4 |

The trigger event index is an index associated with each trigger event type, and may be configured via signaling from the network node or hard-coded as above. The values X1, X2, etc are specific values for the scale factor. The values O1, O2, etc are specific values for the offset.

It will be noted that the table contains only four entries, and that only one trigger event type is defined for each application ID or priority indicator. Of course, the table may comprise multiple entries for each application ID or priority indicator, for different event types (or conversely, multiple entries for each event type for each application ID or priority indicator).

The table set out above may be suited to wireless terminal device operating in an idle mode such as RRC_IDLE. A further look-up table may be defined for wireless terminal devices operating in a connected mode, such as RRC_CONNECTED or RRC Inactive:

| LCH priority for requesting grant (or indicator of data priority) | Index of trigger event | Scale factor | offset |
|---|---|---|---|
| 1 | 1 | X1 | O1 |
| 2 | 2 | X2 | O2 |
| 3 | 3 | X3 | O3 |
| 4 | 4 | X4 | O4 |
| 5 | 4 | X5 | O5 |
| 6 | 5 | X6 | O6 |

Again, it will be understood that multiple entries may be defined for each event type or each priority indicator (logical channel priority, in the above example).

Alternatively, the wireless terminal device may compare the data characteristic (e.g. logical channel priority, or logical channel ID) to one or more thresholds. Depending on the comparison, the wireless terminal device may select appropriate adjustment(s) to the configured value(s). For example, a relatively low value for the priority value or the logical channel ID may indicate a relatively high priority (or vice versa). By comparing the priority value or the logical channel ID to one or more thresholds, the wireless terminal device is able to determine appropriate adjustments according to whether the priority/ID is above or below the threshold (or in between thresholds in the case of multiple thresholds).

Having determined the adjustment(s), in step 304 the wireless terminal device applies the determined adjustment(s) to the configured value(s) for the random access parameter(s). For example, the wireless terminal device may multiply the configured value by a scaling factor, and/or add or subtract the offset from the configured value.

In step 306, the wireless terminal device performs a random access procedure (e.g. as defined above with respect to FIG. 1) using the one or more adjusted values for the random access parameters.

For example, where the random access parameter is the backoff parameter value, the wireless terminal device receives a RAR message from the network node in response to its transmitted random access preamble. The RAR message comprises a BI index, which is mappable by the wireless terminal device (e.g. as per the table shown above, and defined in 3GPP TS 36.321, v 14.3.0) to a backoff parameter value. Let us assume that the BI index is equal to 2, and the determined (configured) value for the backoff parameter value is 20 ms. The wireless terminal device determines the appropriate scaling factor and/or offset (e.g. from the tables identified above, based on the priority indicator, event index, etc) and adjusts the determined backoff parameter value to a new, adjusted value. Let us assume that the logical channel priority is 2, and the event index is 2. The wireless terminal device then selects a random backoff time from the interval [O2, O2+20*X2], where in this case the offset is applied to both ends of the interval, and waits for the selected backoff time before transmitting a further preamble message.

Figure 4:
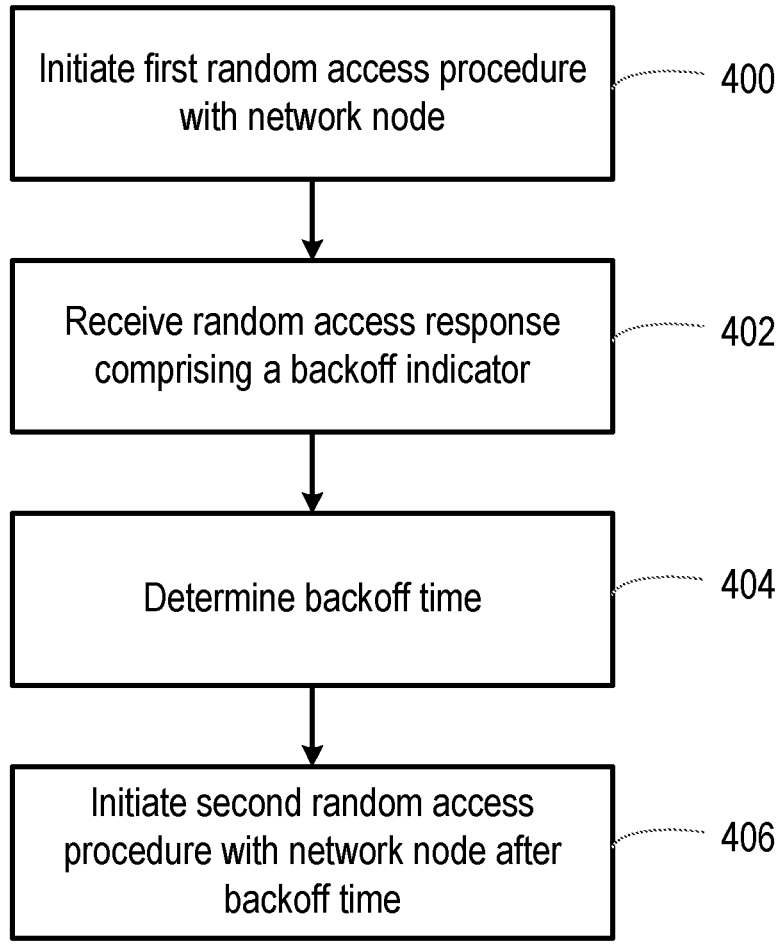
FIG. 4 is a flowchart of a method according to further embodiments of the disclosure.

FIG. 4 is a flowchart of a method according to further embodiments of the disclosure. The method may be carried out in a wireless terminal device (such as the wireless terminal device 214 for example) in communication with a network node (such as the radio access node 212 for example).

The method begins in step 400, in which the wireless terminal device initiates a first random access procedure with a network node, for example, by transmitting a random access preamble (i.e. msg1). For example, the wireless terminal device may have detected a trigger event as discussed above with respect to step 300.

In step 402, the wireless terminal device receives a random access response (RAR) message from the network node (i.e. msg2) comprising a backoff indicator index value. As noted above, backoff indicators may be employed by network nodes while the nodes are experiencing high load.

In step 404, the wireless terminal device determines a backoff time based on the backoff indicator index value, and any adjustments as a function of one or more of: a type of the event triggering the random access procedure in step 400; and a characteristic of data to be transmitted or received by the wireless terminal device upon completion of the random access procedure.

For example, the wireless terminal device may map the backoff indicator index value to a backoff parameter value (e.g. as per the table shown above, and defined in 3GPP TS 36.321, v 14.3.0). If the adjustments are to the backoff parameter value, the adjustments are applied to the backoff parameter value to determine an adjusted backoff parameter value. The wireless terminal device then selects as the backoff time a random number in the range from 0 (or 0 plus an offset) and the adjusted value for the backoff parameter value. Alternatively, the adjustments may be defined for the backoff time itself, in which case the wireless terminal device selects a random number in the range from 0 to the backoff parameter value, and then applies the adjustments to the selected random number to determine the backoff time.

In step 406, once the backoff time has expired the wireless terminal device initiates a second random access procedure with the network node (e.g. transmits a further random access preamble).

Figure 5:
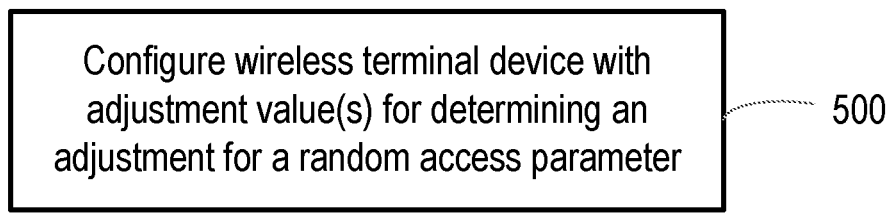
FIG. 5 is a flowchart of a method according to further embodiments of the disclosure.

FIG. 5 is a flowchart of a method according to embodiments of the disclosure. The method may be carried out in a network node operative in a wireless communications network. For example, the method may be carried out in a radio access network node, such as the network node 212, or a node which is coupled to such a radio access network node and operative to receive data corresponding to wireless signals received by the radio access network node, and to control the network node through appropriate signaling (e.g. from the cloud). The description of FIG. 5 is to be read in conjunction with the description of FIG. 3, which describes the corresponding method in the wireless terminal device.

The method begins in step 500, in which the network node transmits, or initiates the transmission of, a configuration of one or more adjustment values to be used by the wireless terminal device in determining adjustment(s) to one or more random access parameters as a function of, or based on, one or more of: the type of event which triggered the random access procedure; and a characteristic of the data which is to be transmitted or received by the wireless terminal device (i.e. in UL or DL) upon completion of the random access procedure. The latter quantity may alternatively be described as a characteristic of the data which caused the event triggering the random access procedure, e.g., a characteristic of the UL/DL data which has arrived for transmission to or for transmission by the wireless terminal device, and prompted the wireless terminal device to initiate a connection with the network, or re-establish a connection to the network, etc.

The adjustment values may define values for a scaling factor (i.e. which is multiplied by a configured value for the random access parameter), or an offset (which is added to or subtracted from the configured value), or both. The values of the scaling factor may be more than or less than one (so representing an increase or a decrease to the configured value for the parameter). Similarly, the values for the offset may be positive or negative. Of course, for some event types and/or some data characteristics (or combinations thereof), the scaling factor may be equal to 1, and/or the offset may be equal to 0.

For example, the adjustment values may be configured via broadcast (e.g. SI) or dedicated (e.g. RRC, on-demand SI) signaling from the network node. The adjustment values may be defined in a cell-wide manner (i.e. applicable to all devices in a cell) or in a device-specific manner, or both. The adjustment values may be configured only for one or more particular device types or categories, such as ultra-reliable, low-latency communication (URLLC) capable devices, machine type communication (MTC) devices, etc.

Each adjustment value may be associated with a particular event type, or a particular data characteristic, or both, such that the adjustment value can be selected by the wireless terminal device based on the particular event type or data characteristic. For example, the adjustment value(s) may be defined in a look-up table stored on the wireless terminal device.

Alternatively, the wireless terminal device may compare the data characteristic (e.g. logical channel priority, or logical channel ID) to one or more thresholds. Depending on the comparison, the wireless terminal device may select appropriate adjustment(s) to the configured value(s). For example, a relatively low value for the priority value or the logical channel ID may indicate a relatively high priority (or vice versa). By comparing the priority value or the logical channel ID to one or more thresholds, the wireless terminal device is able to determine appropriate adjustments according to whether the priority/ID is above or below the threshold (or in between thresholds in the case of multiple thresholds). In such an embodiment, the adjustment values and/or the thresholds, may be configured via signaling from the network node.

The adjustment values may be defined such that, when applied to a particular configured value for the random-access parameter, a first adjusted value results for events or data characteristics being associated with a first latency requirement, and a second adjusted value results for events or data characteristics being associated with a second latency requirement. Particularly for random-access parameters relating to time (such as backoff time, backoff parameter value, ra-ResponseWindowSize, etc), if the second latency requirement is stricter than the first latency requirement (i.e. the events or data characteristics require lower latency), the second adjusted value may be smaller than the first adjusted value. That is, the random access procedure should be quicker for low-latency scenarios than would otherwise be the case. For random-access parameters relating to transmit power (such as preambleInitialReceivedTargetPower, powerRampingStep, etc), if the second latency requirement is stricter than the first latency requirement (i.e. the events or data characteristics require lower latency), the second adjusted value may be larger than the first adjusted value. That is, higher transmit powers would be used for low-latency scenarios than would otherwise be the case.

Thus, in this way, a network node can ensure that data or events requiring low latency are handled with appropriate parameter values for random access procedures.

Figure 6:
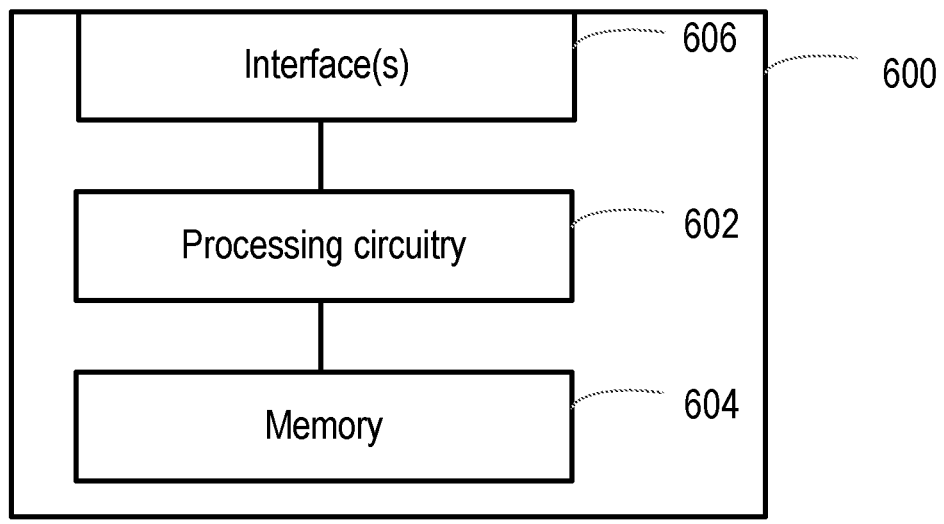
FIG. 6 is a schematic illustration of a wireless terminal device according to embodiments of the disclosure.

FIG. 6 is a schematic diagram of a terminal device 600 according to embodiments of the disclosure. For example, the terminal device 600 may correspond to the terminal device 214 described above. The terminal device 600 may be suitable for performing the methods described above with respect to FIGS. 3 and/or 4.

The terminal device 600 comprises processing circuitry 602 and a non-transitory machine-readable medium 604 storing instructions which, when executed by the processing circuitry 602, cause the wireless terminal device to: detect an event triggering a random access procedure; determine an adjustment for a random access parameter as a function of one or more of: a type of the event triggering the random access procedure; and a characteristic of data to be transmitted or received by the wireless terminal device upon completion of the random access procedure; apply the adjustment to a configured value for the random access parameter to obtain an adjusted value for the random access parameter; and perform the random access procedure with a network node operable in the wireless communications network, using the adjusted value for the random access parameter.

The terminal device 600 may further comprise one or more interfaces 606, providing interfaces for the transmission and/or reception of signals via any suitable modality. For example, the interfaces 606 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The processing circuitry 602, machine-readable medium 604 and interfaces 606 may be coupled to each other in any suitable manner. For example, although FIG. 6 shows the components coupled together in series, it will be understood by those skilled in the art that the components may be coupled together in an alternative manner, such as via a bus.

Figure 7:
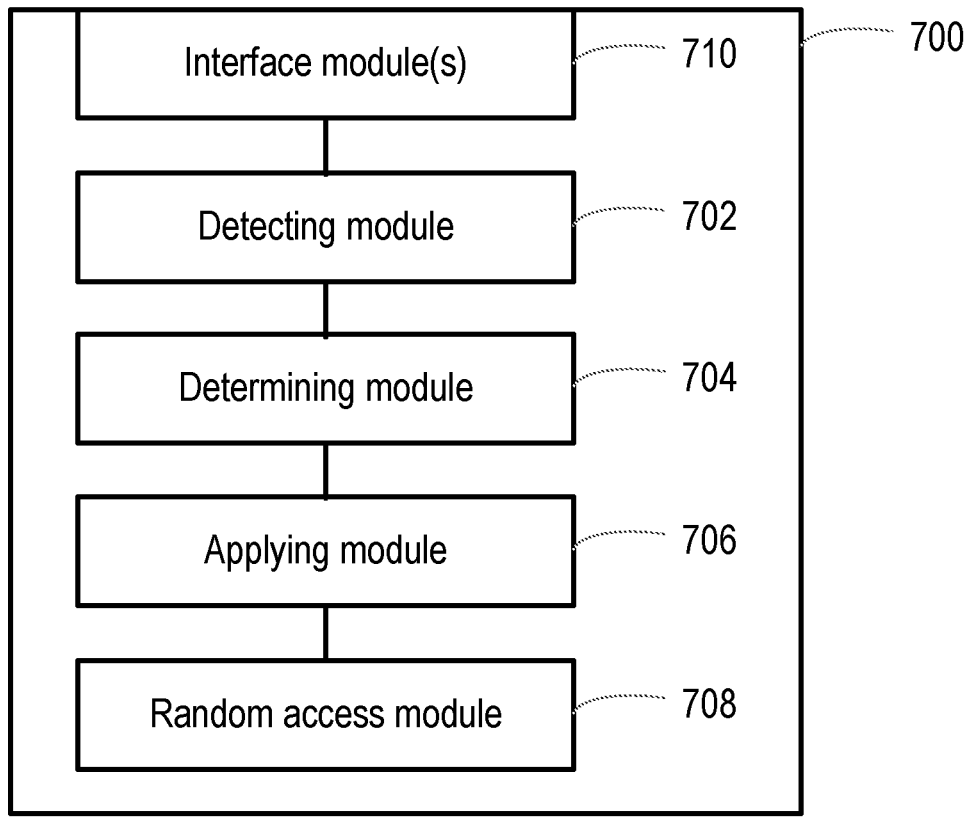
FIG. 7 is a schematic illustration of a wireless terminal device according to embodiments of the disclosure.

FIG. 7 is a schematic diagram of a terminal device 700 according to further embodiments of the disclosure. For example, the terminal device 700 may correspond to the terminal device 214 described above. The terminal device 700 may be suitable for performing the methods described above with respect to FIGS. 3 and/or 4.

The terminal device 700 comprises a detecting module 702, a determining module 704, an applying module 706 and a random access module 708. The detecting module 702 is configured to detect an event triggering a random access procedure. The determining module 704 is configured to determine an adjustment for a random access parameter as a function of one or more of: a type of the event triggering the random access procedure; and a characteristic of data to be transmitted or received by the wireless terminal device upon completion of the random access procedure. The applying module 706 is configured to apply the adjustment to a configured value for the random access parameter to obtain an adjusted value for the random access parameter. The random access module 708 is configured to perform the random access procedure with a network node operable in the wireless communications network, using the adjusted value for the random access parameter.

The terminal device 700 may further comprise one or more interface modules 710, providing one or more interfaces for the transmission and/or reception of signals via any suitable modality. For example, the interface module 710 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The detecting module 702, the determining module 704, the applying module 706, the random access module 708 and the interface module(s) 710 may be coupled to each other in any suitable manner. For example, although FIG. 7 shows the components coupled together in series, it will be understood by those skilled in the art that the components may be coupled together in an alternative manner, such as via a bus.

Figure 8:
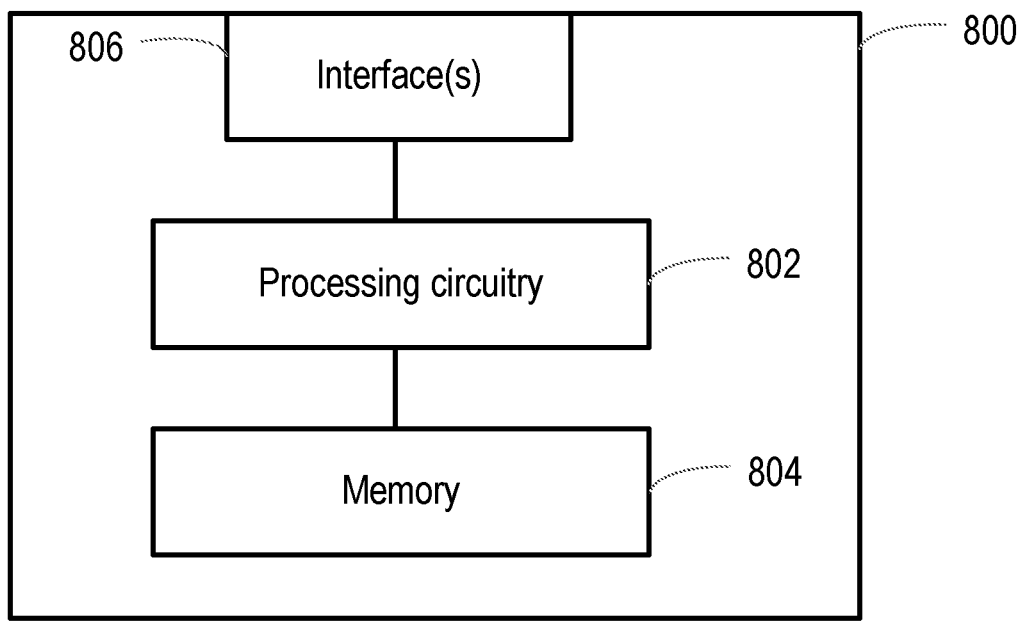
FIG. 8 is a schematic illustration of a network node according to embodiments of the disclosure.

FIG. 8 is a schematic diagram of a network node 800 according to embodiments of the disclosure. For example, the network node 800 may be a radio access network node, such as the network node 112 as described above. Alternatively, the network node may be communicatively coupled to such a radio access network node. The node 800 may be suitable for performing the method described above with respect to FIG. 5.

The network node 800 comprises processing circuitry 802 and a non-transitory machine-readable medium 804 storing instructions which, when executed by the processing circuitry, cause the network node 800 to: configure a wireless terminal device operable in the wireless communications network with one or more adjustment values for determining an adjustment for a random access parameter and obtaining an adjusted value for the random access parameter for use in a random access procedure, the adjustment being determined as a function of one or more of: a type of an event triggering the random access procedure; and a characteristic of data to be transmitted or received by the wireless terminal device upon completion of the random access procedure.

The node 800 may further comprise one or more interfaces 806, providing interfaces for the transmission and/or reception of signals via any suitable modality. For example, the interfaces 806 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The processing circuitry 802, machine-readable medium 804 and interfaces 806 may be coupled to each other in any suitable manner. For example, although FIG. 8 shows the components coupled together in series, it will be understood by those skilled in the art that the components may be coupled together in an alternative manner, such as via a bus.

Figure 9:
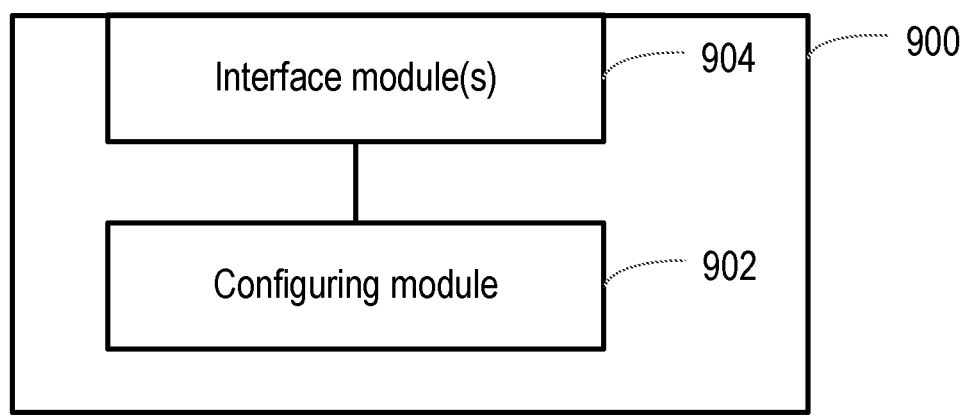
FIG. 9 is a schematic illustration of a network node according to embodiments of the disclosure.

FIG. 9 is a schematic diagram of a network node 900 according to embodiments of the disclosure. For example, the network node 900 may be a radio access network node, such as the network node 112 as described above. Alternatively, the network node may be communicatively coupled to such a radio access network node. The node 900 may be suitable for performing the method described above with respect to FIG. 5.

The network node 900 comprises a configuring module 902. The configuring module 902 is configured to configure a wireless terminal device operable in the wireless communications network with one or more adjustment values for determining an adjustment for a random access parameter and obtaining an adjusted value for the random access parameter for use in a random access procedure, the adjustment being determined as a function of one or more of: a type of an event triggering the random access procedure; and a characteristic of data to be transmitted or received by the wireless terminal device upon completion of the random access procedure.

The node 900 may further comprise one or more interface modules 904, providing one or more interfaces for the transmission and/or reception of signals via any suitable modality. For example, the interface module(s) 904 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The configuring module 902 and interface module(s) 904 may be coupled to each other in any suitable manner. For example, although FIG. 9 shows the components coupled together in series, it will be understood by those skilled in the art that the components may be coupled together in an alternative manner, such as via a bus.

Thus as described above, embodiments of the disclosure provide methods, apparatus and computer-readable media for random access in a wireless communications network.

It will be understood that the detailed examples outlined above are merely examples. According to embodiments of the disclosure, the steps may be presented in a different order to that described herein. Furthermore, additional steps may be incorporated in the method that are not explicitly recited above.

The invention claimed is:

1. A method in a user equipment (UE) operable in a wireless communications network, the method comprising:
    detecting an event triggering a random access procedure;
    determining an adjustment for a random access parameter as a function of one or more of:
        a type of the event triggering the random access procedure; and
        a characteristic of data to be transmitted or received by the UE upon completion of the random access procedure;
    applying the adjustment to a configured value for the random access parameter to obtain an adjusted value for the random access parameter; and
    performing the random access procedure with a base station operable in the wireless communications network, using the adjusted value for the random access parameter;
    wherein the configured value for the random access parameter is configured in a response message, received from the base station, in response to a first random access procedure, and wherein the method comprises performing a second random access procedure using the adjusted value for the random access parameter.

2. A method in a base station operable in a wireless communications network, the method comprising:

configuring a user equipment (UE) operable in the wireless communications network with one or more adjustment values for determining an adjustment for a configured value of a random access parameter, to obtain an adjusted value for the random access parameter for use in a random access procedure, the adjustment of the configured value being determined as a function of one or more of:
   a type of an event triggering the random access procedure; and
   a characteristic of data to be transmitted or received by the UE upon completion of the random access procedure;
wherein the configured value for the random access parameter is configured in a response message, transmitted by the base station, in response to a first random access procedure.

3. A user equipment (UE), operable in a wireless communication network, the UE comprising:
   processing circuitry; and
   a non-transitory machine-readable medium storing instructions that, when executed by the processing circuitry, cause the UE to:
      detect an event triggering a random access procedure;
      determine an adjustment for a random access parameter as a function of one or more of:
         a type of the event triggering the random access procedure; and
         a characteristic of data to be transmitted or received by the UE upon completion of the random access procedure;
      apply the adjustment to a configured value for the random access parameter to obtain an adjusted value for the random access parameter; and
      perform the random access procedure with a base station operable in the wireless communications network, using the adjusted value for the random access parameter;
   wherein the configured value for the random access parameter is configured in a response message, received from the base station, in response to a first random access procedure, and wherein the method comprises performing a second random access procedure using the adjusted value for the random access parameter.

4. The UE according to claim 3, wherein the type of the event is one or more of: initial access; connection re-establishment; handover; downlink data arrival requiring a random access procedure; uplink data arrival requiring a random access procedure; a requirement to determine the UE position; and on-demand system information transmission.

5. The UE according to claim 3, wherein the characteristic of data comprises one or more of:
   an identifier for an application executable by the UE to which the data relates;
   a type of an application executable by the UE to which the data relates;
   an access class or access category of the UE;
   an identifier for the data; and
   a priority indicator for the data.

6. The UE according to claim 5, wherein the identifier for the data comprises one of: a flow ID, a session ID, a logical channel ID, a logical channel group ID, and a radio bearer identifier.

7. The UE according to claim 6, wherein the instructions cause the UE to determine the adjustment by determining a first adjustment for logical channel identifier values or logical channel group identifier values above a threshold, and determining a second adjustment for logical channel identifier values or logical channel group identifier values below the threshold.

8. The UE according to claim 5, wherein the priority indicator is associated with one of: a flow ID, a session ID, a logical channel ID, a logical channel group ID, and a radio bearer identifier.

9. The UE according to claim 5, wherein the priority indicator comprises one or more of: a quality of service indicator; a logical channel priority value; and a logical channel group priority value.

10. The UE according to claim 5, wherein the UE is caused to determine the adjustment by determining a first adjustment for priority indicator values above a threshold and determining a second adjustment for priority indicator values below the threshold.

11. The UE according to claim 3, wherein the random access parameter comprises one of: a backoff parameter; and a power ramping step between successive random access preamble transmissions.

12. The UE according to claim 3, wherein the adjustment comprises one or more of: a scaling factor and an offset.

13. The UE according to claim 3, wherein the adjustment is configured in relation to a latency requirement of the one or more of: the type of the event triggering the random access procedure, and the characteristic of data to be transmitted or received by the UE upon completion of the random access procedure.

14. The UE according to claim 13, wherein the adjustment is configured such that, for a particular configured value for the random access parameter, a first latency requirement results in a first adjusted value and a second latency requirement results in a second adjusted value, wherein the second latency requirement is stricter than the first latency requirement, and wherein the second adjusted value is smaller than the first adjusted value.

15. A base station operable in a wireless communications network, the base station comprising:
   processing circuitry; and
   a non-transitory machine-readable medium storing instructions that, when executed by the processing circuitry, cause the base station to:
      configure a user equipment (UE) operable in the wireless communications network with one or more adjustment values for determining an adjustment for a configured value of a random access parameter to obtain an adjusted value for the random access parameter for use in a random access procedure, the adjustment of the configured value being determined as a function of one or more of:
         a type of an event triggering the random access procedure; and
         a characteristic of data to be transmitted or received by the UE upon completion of the random access procedure;
      wherein the configured value for the random access parameter is configured in a response message, transmitted by the base station, in response to a first random access procedure.

16. The base station according to claim 15, wherein the type of the event is one or more of: initial access; connection re-establishment; handover; downlink data arrival requiring a random access procedure; uplink data arrival requiring a random access procedure; a requirement to determine the UE position; and on demand system information transmission.

17. The base station according to claim 15, wherein the characteristic of data comprises one or more of:
   an identifier for an application executable by the UE to which the data relates;
   a type of an application executable by the UE to which the data relates;
   an access class or access category of the UE;
   an identifier for the data; and
   a priority indicator for the data.

18. The base station according to claim 15, wherein the random access parameter comprises one of: a backoff parameter; and a power ramping step between successive random access preamble transmissions.

* * * * *